US010051681B2

(12) United States Patent
Lau et al.

(10) Patent No.: US 10,051,681 B2
(45) Date of Patent: Aug. 14, 2018

(54) LOCAL CALL SERVICE CONTROL FUNCTION SERVER SELECTION

(71) Applicants:Verizon Patent and Licensing Inc., Arlington, VA (US); Cellco Partnership, Arlington, VA (US)

(72) Inventors: Priscilla Lau, Fremont, CA (US); Robin P. Clair, Flower Mound, TX (US); John M. Bittenbender, Bloomsburg, PA (US); Marcos Vinicio Desouza, Frisco, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 1011 days.

(21) Appl. No.: 14/244,215

(22) Filed: Apr. 3, 2014

(65) Prior Publication Data

US 2015/0289222 A1   Oct. 8, 2015

(51) Int. Cl.
*H04W 76/16* (2018.01)
*H04L 29/06* (2006.01)
*H04W 76/19* (2018.01)

(52) U.S. Cl.
CPC ......... *H04W 76/19* (2018.02); *H04L 65/1016* (2013.01); *H04L 65/1046* (2013.01); *H04L 65/1073* (2013.01)

(58) Field of Classification Search
CPC ............................ H04W 76/028; H04W 76/19

USPC ...................................................... 455/435.1
See application file for complete search history.

(56) References Cited

U.S. PATENT DOCUMENTS

| | | | | |
|---|---|---|---|---|
| 2008/0305794 A1* | 12/2008 | Mukaiyama | ........ | H04L 65/1046 455/435.1 |
| 2015/0124588 A1* | 5/2015 | Hallenstal | ........... | H04L 65/1016 370/221 |
| 2015/0282242 A1* | 10/2015 | Merino Vazquez | ............. | H04L 65/1073 370/221 |
| 2017/0026423 A1* | 1/2017 | Merino Vazquez | ............. | H04L 65/1016 |

* cited by examiner

*Primary Examiner* — Kamran Afshar
*Assistant Examiner* — David Orange

(57) ABSTRACT

A selection server device may receive a first registration request and determine that a user device is associated with a non-local call service control function (CSCF) server device and that the user device is located outside of a service area associated with the non-local CSCF server; output a non-preferred server indication to the non-local CSCF server device to cause the non-local CSCF server device to be disassociated with the user device; receive a second registration request from the user device; determine that the user device is not associated with any CSCF server; and output the second registration request to a local CSCF server device, associated with a service area in which the user device is located, to cause the local CSCF server device to register the user device with the local CSCF server device.

20 Claims, 8 Drawing Sheets

LOCAL CALL SERVICE CONTROL FUNCTION SERVER SELECTION

BACKGROUND

A user device may register with a network (e.g., a cellular network) in order to place and/or receive telephone calls. The registration of the user device may be initiated by the network or by the user device. For example, the network may initiate registration of the user device when an incoming call is placed to the user device and when the user device is powered off or otherwise disconnected from the network. The network may register the user device in order to assign a call service control function (CSCF) server to the user device so that the CSCF server may process the incoming call (e.g., by forwarding the call to voicemail, application server, another user device, and/or to some other network). Alternatively, the user device may itself initiate the registration when the user device powers on a radio used to connect to the network and/or when a current registration for the user device expires.

When the user device registers with the network (e.g., after the network initiates the registration or after the user device itself initiates the registration), the particular CSCF server that may be assigned to the user device may be a CSCF server that was previously assigned to the user device when the user device was previously registered with the network.

DETAILED DESCRIPTION OF THE PREFERRED EMBODIMENTS

The following detailed description refers to the accompanying drawings. The same reference numbers in different drawings may identify the same or similar elements.

When a network registers a user device (e.g., in response to when the network initiates a registration process or in response to when the user device itself initiates the registration process), a particular CSCF server may be assigned to the user device. The particular CSCF server may be a CSCF server that was previously assigned to the user device when the user device was previously registered with the network. Assigning the previous CSCF server to the user device may be acceptable, for example, if the CSCF server is assigned in response to a network-initiated registration (e.g., so that the CSCF server may process an incoming call that should be forwarded to voicemail, application server, another user device, and/or another network, when the user device is disconnected from the network). However, assigning the previous CSCF server to the user device may be problematic if the previous CSCF server is assigned in response to a user device initiated registration and when the user device travels to a service area that is not associated with the previously assigned CSCF server. For example, assigning the previous CSCF server to the user device may be problematic when the user device is powered off (or otherwise disconnects from the network), and then re-registers with the network after traveling a relatively large distance (e.g., by air travel).

Systems and/or methods, as described herein, may assign a user device to a CSCF server that is associated with a service area in which the user device is located (e.g., in response to a user device initiated registration). As a result, network load may be reduced in relation to when the user device is assigned to a CSCF server that is associated with a different service area from which the user device is located.

Figure 1A:
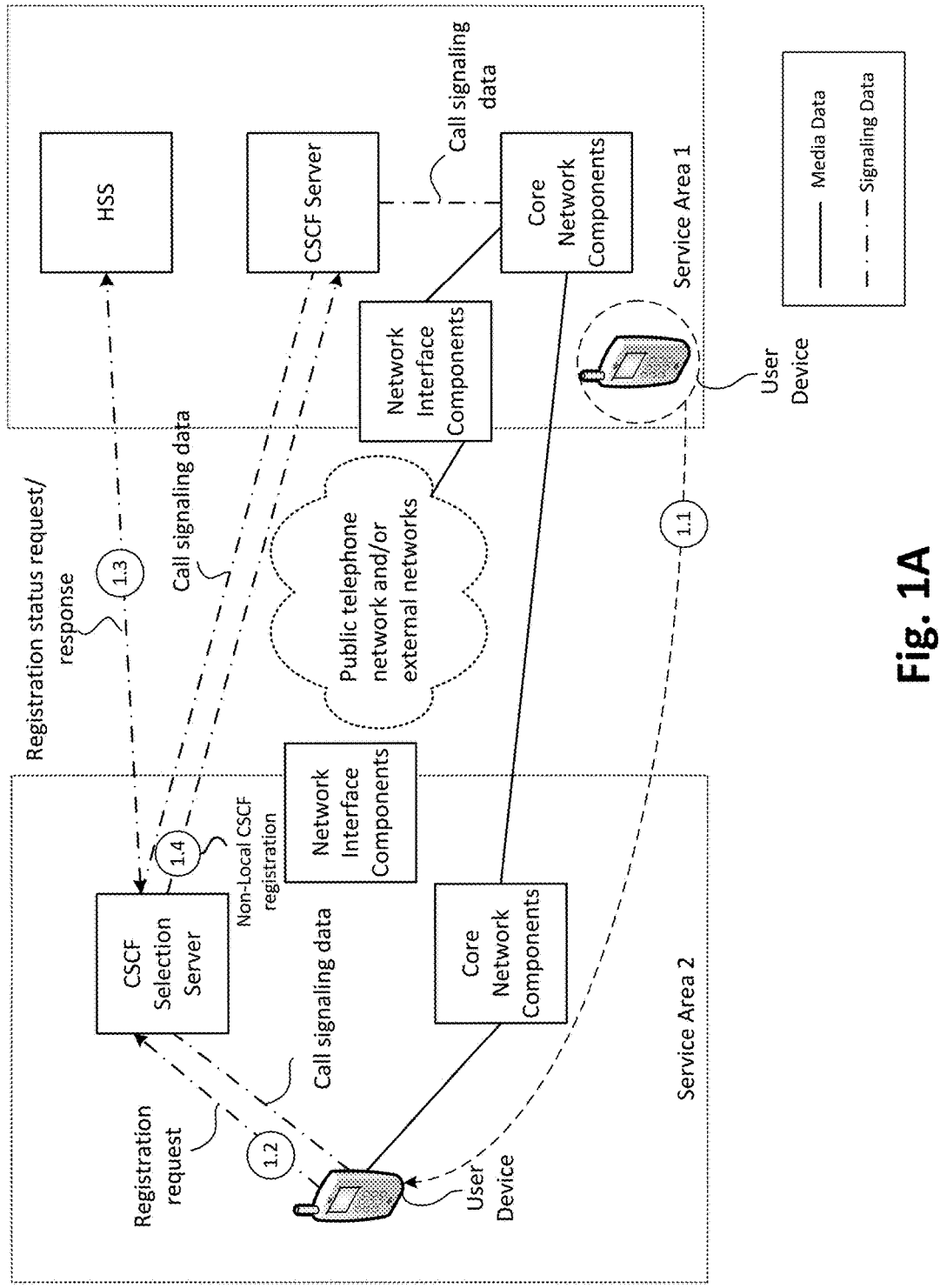
FIGS. 1A and 1B illustrate an example overview of an implementation described herein.
Figure 1B:
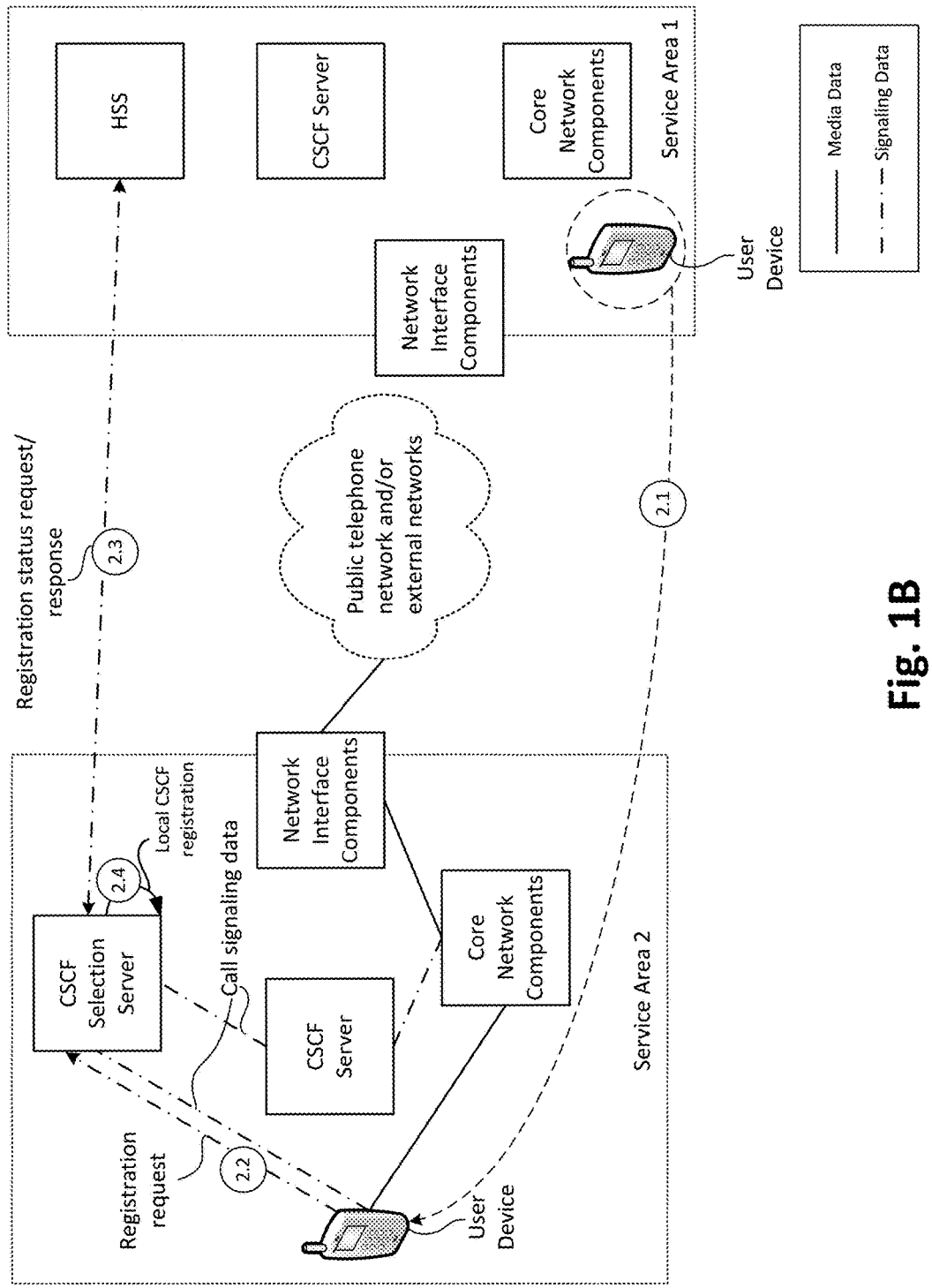

FIGS. 1A and 1B illustrate an example implementation as described herein. Referring to FIG. 1A, assume that a user device travels (arrow 1.1) from a first service area associated with a network (e.g., a home service area, such as service area 1) to a second service area associated with the network (service area 2). Further, assume that that prior to traveling to service area 2, the user device was assigned to a CSCF server associated with service area 1. When accessing the network from service area 2, the user device may provide a registration request to a CSCF selection server, associated with service area 2 (arrow 1.2).

The registration request may identify a Home Subscriber Server (HSS) associated with the user's home service area (e.g., service area 1). The CSCF selection server may request, from the HSS associated with service area 1, a registration status of the user device, and the HSS may provide a response to the registration status request (arrow 1.3). The response may include information indicating that the user device was assigned to the CSCF server of service area 1, and the CSCF selection server may register the user device (arrow 1.4) to the CSCF server of service area 1 even though the user device is located in service area 2. When the user device is assigned to the CSCF server of service area 1, signaling data and/or voice data for telephone calls associated with the user device may be transmitted by network components associated with service area 1 (e.g., the CSCF server, core network components, network interface components, etc.). As a result, the signaling and/or media path may be longer in relation to when the signaling data and/or voice data is transmitted by network components associated with service area 2. This longer path may cause relatively higher latency and jitter and/or may cause a degradation in voice quality (e.g., during telephone calls).

Referring to FIG. 1B, assume that a user device travels from service area 1 to service area 2 (arrow 2.1), and that prior to traveling to service area 2, the user device was assigned to a CSCF server associated with service area 1. When accessing the network from service area 2, the user device may provide a registration request to a CSCF selection server, associated with service area 2 (arrow 2.2). The CSCF selection server may provide a registration status request to an HSS, associated with service area 1, and the HSS may provide a response to the request (arrow 2.3). The response may indicate that the user device was assigned to the CSCF server of service area 1.

In some implementations, the CSCF selection server may identify that the CSCF server, previously assigned to the user device, is not associated with service area 2, and may not register the user device with the previously assigned CSCF server. The CSCF server may instead register the user device with a local CSCF server (arrow 2.4), such as the CSCF server associated with service area 2 (e.g., the CSCF server associated with the service area in which the user device is located). When the user device is assigned to the CSCF server of service area 2, signaling data and/or voice data for telephone calls associated with the user device may be transmitted by network components associated with service area 2 (e.g., the CSCF server, core network components, network interface components, etc.). As a result, the signaling and/or media path may be shorter in relation to when the signaling data and/or voice data is transmitted by network components associated with service area 1. This shorter path may provide lower latency and jitter and/or higher voice quality (e.g., for telephone calls).

Figure 2:
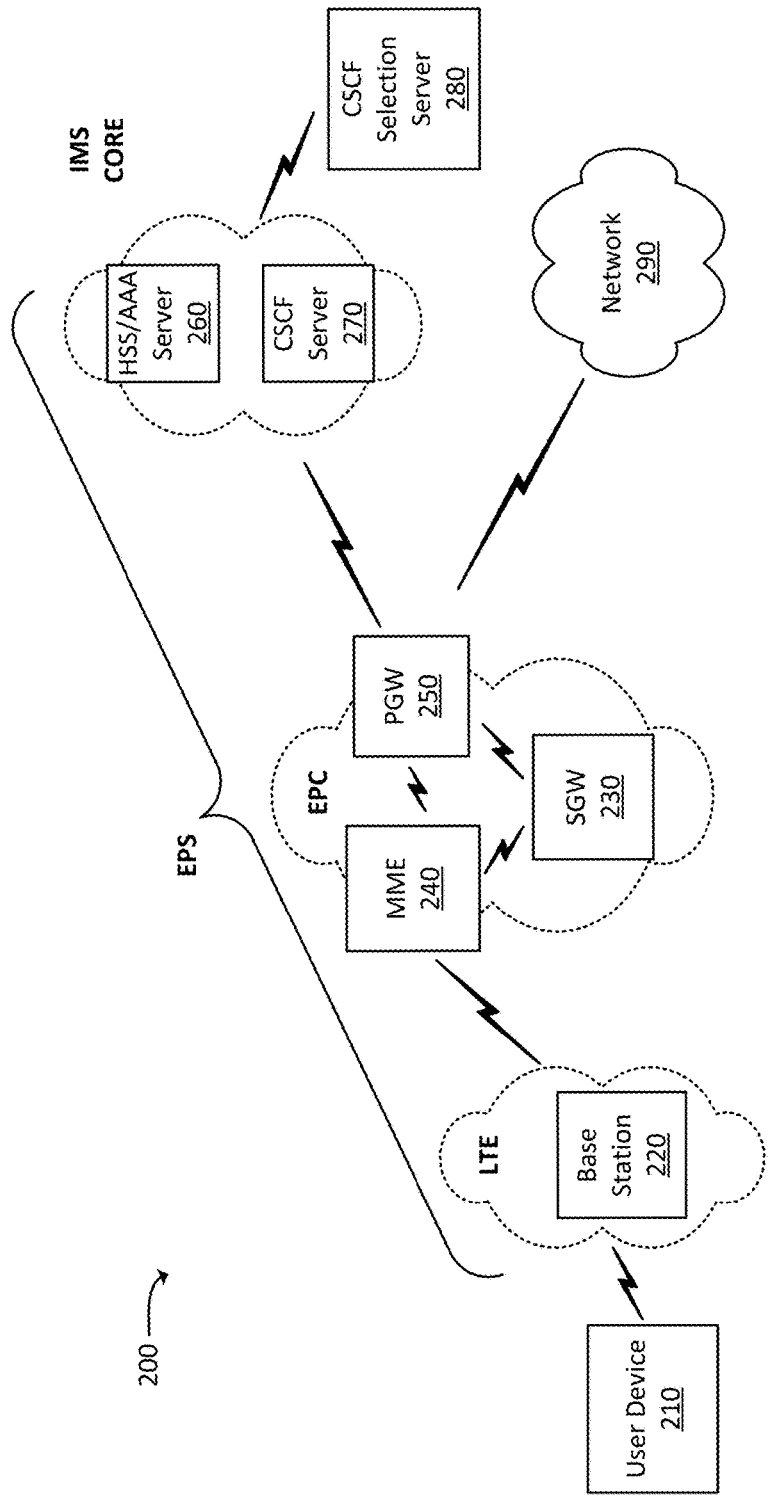
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, a base station 220, a serving gateway 230 (referred to as "SGW 230"), a mobility management entity device 240 (referred to as "MME 240"), a packet data network (PDN) gateway (PGW) 250 (referred to as "PGW 250"), a home subscriber server (HSS)/authentication, authorization, accounting (AAA) server 260 (referred to as an "HSS/AAA server 260"), a call service control function (CSCF) server 270 (referred to as "CSCF server 270"), CSCF selection server 280, and a network 290.

Environment 200 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 and may enable user device 210 to communicate with network 290 and/or the IMS core. The IMS core may include HSS/AAA server 260 and/or CSCF server 270. The IMS core may manage authentication, connection initiation, account information, a user profile, etc. associated with user device 210. As shown in FIG. 2, the LTE network may include base station 220.

User device 210 may include any computation or communication device, such as a wireless mobile communication device that is capable of communicating with base station 220 and/or a network (e.g., network 290). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data/call to and/or receive data/call from network 290.

User device 210 may provide a registration request when accessing the EPS and/or the IMS core. For example, user device 210 may provide the registration request when a radio of user device 210, used to access the EPS and/or the IMS core, is powered on. Additionally, or alternatively, user device 210 may provide a registration request when a current registration for user device 210 has expired.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 290 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computing devices, such as a server device or a collection of server devices. HSS/AAA server 260 may store information identifying a particular CSCF server 270 associated with user device 210. For example, HSS/AAA server 260 may store an address of the particular CSCF server 270, an identifier of CSCF server 270, and/or some other information to uniquely identify the particular CSCF server 270. In some implementations, HSS/AAA server 260 may manage, update, and/or store profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication connection with user device 210.

CSCF server 270 may include one or more computing devices, such as a server device or a collection of server devices. In some implementations, CSCF server 270 may process and/or route calls to and from user device 210 via the EPC. For example, CSCF server 270 may process calls, received from network 290, that are destined for user device 210. In another example, CSCF server 270 may process calls, received from user device 210, that are destined for network 290. CSCF server 270 may register user device 210 based on receiving a registration instruction from CSCF selection server 280.

In some implementations, CSCF server 270 may be referred to as a "local CSCF server 270" (e.g., when CSCF server 270 is associated with a particular service area). CSCF server 270 may also be referred to as a "non-local CSCF server 270" (e.g., when CSCF server 270 is not associated with the particular service area). A particular CSCF server 270 may be either a local or non-local CSCF server 270 relative to different service areas. In some implementations, CSCF server 270 may include a Proxy-CSCF (P-CSCF) server, a Serving-CSCF (S-CSCF) server, and/or an Interrogating-CSCF (I-CSCF) server.

CSCF selection server 280 may include one or more computing devices, such as a server device or a collection of server devices. In some implementations, CSCF selection server 280 may receive a registration request from user device 210 (e.g., when a radio of user device 210, used to access the EPS and/or IMS core, is powered on and/or when a current registration of user device 210 has expired). CSCF selection server 280 may request a registration status of user device 210 from a particular HSS/AAA server 260, associated with user device 210, and may receive, from HSS/AAA server 260, an identifier of a particular CSCF server 270 associated with user device 210. CSCF selection server 280 may determine whether the identifier of the particular CSCF server 270 is a local or non-local CSCF server 270, relative to a service area of CSCF selection server 280. CSCF selection server 280 may assign user device 210 to a local CSCF server 270, and may cause HSS/AAA server 260 to disassociate a non-local CSCF server 270 from user device 210.

In some implementations, CSCF selection server 280 may register user device 210 and assign CSCF server 270 to user device 210 without receiving a registration request from user device 210. For example, CSCF selection server 280 may perform a "default registration" for user device 210 if user device 210 is powered off or otherwise not connected to the IMS and when an incoming call arrives for user device 210. CSCF selection server 280 may perform the default registration and assign CSCF server 270 to user device 210 so that the incoming call can be processed and so that the call may be forwarded to the user's voice mailbox, an application server, another user device 210, and/or redirected to a different network. When performing the default registration, CSCF selection server 280 may request (e.g., from HSS/AAA server 260) information identifying a particular CSCF server 270 to be assigned to user device 210.

In some implementations, CSCF selection server 280 may be referred to as a "local CSCF selection server 280" (e.g., when CSCF selection server 280 is associated with a particular service area). CSCF selection server 280 may also be referred to as a "non-local CSCF selection server 280" (e.g., when CSCF selection server 280 is not associated with the particular service area). A particular CSCF selection server 280 may be either a local or non-local CSCF selection server 280 relative to different service areas. In some implementations, CSCF selection server 280 may include an I-CSCF server.

Network 290 may include one or more wired and/or wireless networks. For example, network 290 may include a cellular network (e.g., a second generation ("2G") network, a third generation ("3G") network, a fourth generation ("4G") network, a fifth generation ("5G") network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, network 290 may include a local area network ("LAN"), a wide area network ("WAN"), a metropolitan network ("MAN"), the Public Switched Telephone Network ("PSTN"), an ad hoc network, a managed Internet Protocol ("IP") network, a virtual private network ("VPN"), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
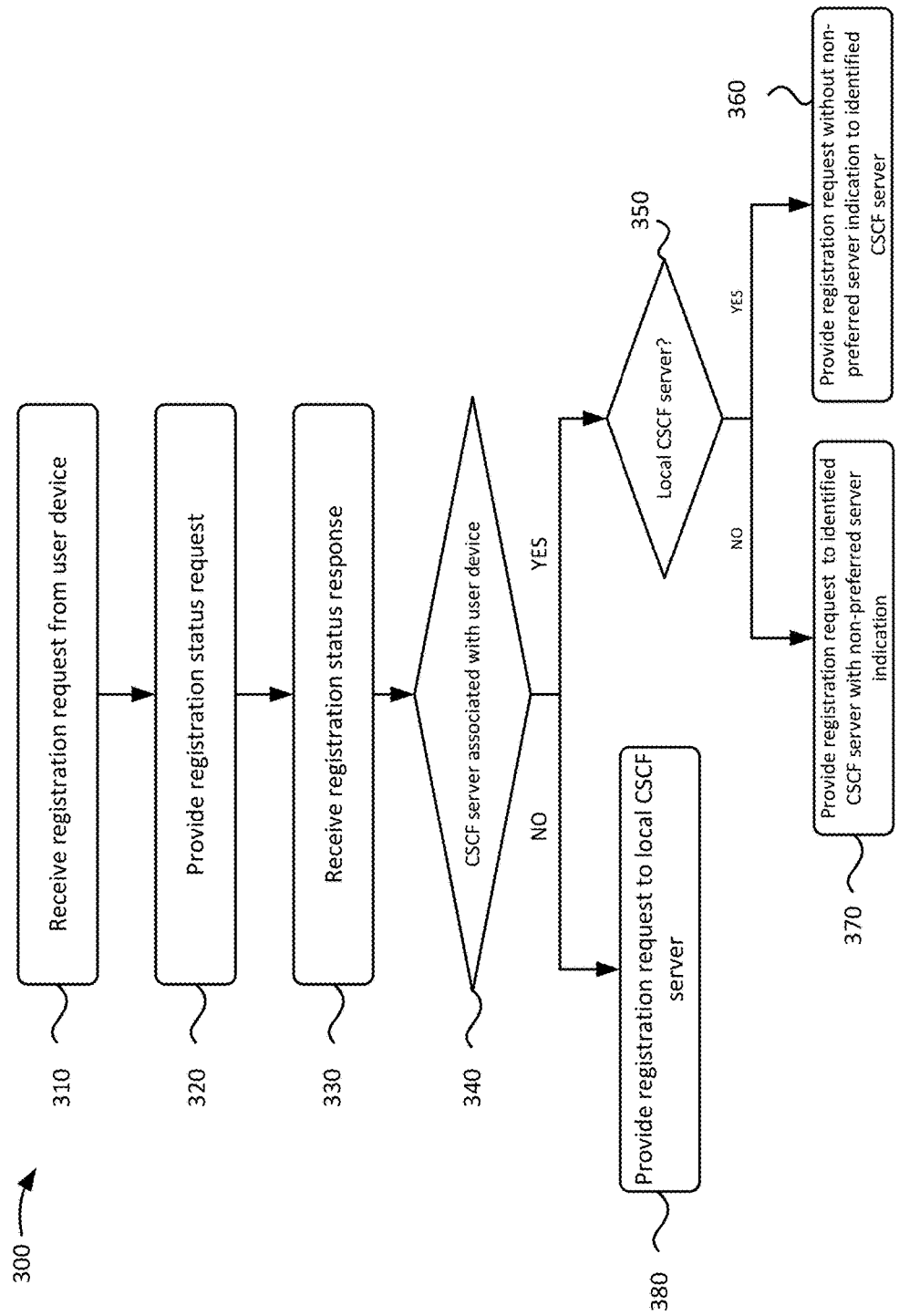
FIG. 3 illustrates a flowchart of an example process for assigning a local CSCF server to a user device.

FIG. 3 illustrates a flowchart of an example process 300 for assigning a local CSCF server to a user device. In some implementations, process 300 may be performed by CSCF selection server 280. In some implementations, some or all of process 300 may be performed by one or more other devices.

As shown in FIG. 3, process 300 may include receiving a registration request from a user device (block 310). For example, CSCF selection server 280 may receive the registration request from user device 210 when the user device travels to a service area associated with CSCF selection server 280. CSCF selection server 280 may also receive the registration request when a radio of user device 210, used to access the EPS and/or IMS core, is powered on and/or when a current registration of user device 210 has expired. Additionally, or alternatively, CSCF selection server 280 may receive the registration request from user device 210 at some other time. The registration request may include an identifier of user device 210, and may include an identifier of a particular HSS/AAA server 260 associated with user device 210. In some implementations, the registration request may be a session initiation protocol (SIP) REGISTER request and/or another type of message or request.

Process 300 may also include providing a registration status request (block 320). For example, CSCF selection server 280 may provide the registration status request to the particular HSS/AAA server 260 identified by any mean, such as using the HSS/AAA server address information or the subscriber identification of user device 210 included in the registration request, routing the request via a network router, or looking up the address information from a server location function in the network. The registration status request may include information identifying user device 210 and a request for an identifier of a particular CSCF server 270 associated with user device 210. In some implementations, CSCF selection server 280 may provide the registration status request using the Diameter protocol and/or some other protocol.

Process 300 may further include receiving a registration status response (block 330). For example, CSCF selection server 280 may receive the registration status response from HSS/AAA server 260. In some implementations, the registration status response may include information identifying a particular CSCF server 270 associated with user device 210. For example, the registration status response may include an address, (e.g., an IP address, FQDN, and/or some other type of address) and/or some other type of identifier to uniquely identify the particular CSCF server 270. In some implementations, the registration status response may identify the CSCF server 270 previously assigned to user device 210 (e.g., from when user device 210 was previously registered). In some implementations, the registration status response may include a null value and/or some other indication that user device 210 is not associated with any CSCF server 270. For example, as described in greater detail below with respect to process block 360, HSS/AAA server 260 may provide a registration response indicating that user device 210 is not associated with any CSCF server 270 after a previously assigned CSCF server 270 has provided a de-registration to the HSS/AAA server 260 or the previous registration has expired.

Process 300 may also include determining whether a CSCF server is associated with the user device (block 340). For example, CSCF selection server 280 may determine whether CSCF server 270 is associated with user device 210 based on the registration status response.

If, for example, CSCF server 270 is associated with user device 210, such as when the registration status response includes an identifier of CSCF server 270 (block 340—YES), process 300 may further include determining whether the CSCF server is a local CSCF server (block 350). For example, CSCF selection server 280 may determine whether CSCF server 270 is a local CSCF server 270 (e.g., local in relation to the service area of CSCF selection server 280). In some implementations, CSCF selection server 280 may determine whether CSCF server 270 is a local CSCF server 270 based on a format of the identifier included in the registration status response. For example, the identifier may be an address that identifies a service location of CSCF server 270 (e.g. the address "location1.cscf01.ims.com."). If the address identifies that the service location of CSCF server 270 corresponds to a service location of CSCF selection server 280 (e.g., "location1"), CSCF selection server 280 may determine that CSCF server 270 is a local CSCF server 270. Additionally, or alternatively, CSCF selection server 280 may determine whether CSCF server 270 is a local CSCF server 270 based on a data structure, associated with CSCF selection server 280, that stores identifiers of CSCF servers 270 that are local to CSCF selection server 280. Additionally, or alternatively, CSCF selection server 280 may determine whether CSCF server 270 is a local CSCF server 270 based on some other technique.

If, for example, CSCF selection server 280 determines that CSCF server 270 is a local CSCF server 270 (block 350—YES), process 300 may further include providing a registration request, without a non-preferred server indication, to the identified CSCF server (block 360). For example, CSCF selection server 280 may provide the registration request to cause CSCF server 270 to register user device 210. As a result, user device 210 may be registered with a local CSCF server 270.

If, on the other hand, CSCF selection server 280 determines that CSCF server 270 is not a local CSCF server 270 (block 350—NO), process 300 may also include providing a registration request with a non-preferred server indication to the identified CSCF server (block 370). For example, CSCF selection server 280 may provide the registration request with the non-preferred server indication to the CSCF server 270 identified in the registration status response (e.g., a non-local CSCF server 270). The non-preferred server indication may indicate, to CSCF server 270, that CSCF server 270 is a non-local CSCF server 270 and that CSCF server 270 should de-register with user device 210. Based on receiving the non-preferred server indication, CSCF server 270 may provide a de-registration request to HSS/AAA server 260. In some implementations, for example, when an active session between user device 210 (or a device on behalf of user device 210, such as voicemail server) and CSCF server 270 exists, CSCF server 270 may refrain from providing the de-registration request until after the active session has terminated (e.g., to prevent service interruption for user device 210). The non-preferred server indication may indicate, to CSCF server 270, that the de-registration request should be provided when the active session is terminated between user device 210 and CSCF server 270. If an active session does not exist between user device 210 and CSCF server 270, CSCF server 270 may immediately provide the de-registration request upon receiving the non-preferred server indication.

Based on receiving the de-registration request, HSS/AAA server 260 may disassociate CSCF server 270 from user device 210 (e.g., by removing information associating CSCF server 270 with user device 210). User device 210 may then receive an indication of the de-registration, and may provide a new registration request to CSCF selection server 280 (as described above with respect to process block 310). In turn, CSCF selection server 280 may provide a registration status request (block 320) and receive a registration status response (block 330). Since HSS/AAA server 260 removed information associating CSCF server 270 with user device 210, the registration status response may include a null value and/or information indicating that a CSCF server 270 is not associated with user device 210. CSCF selection server 280 may therefore determine that a CSCF server 270 is not associated with user device 210 (block 340—NO).

If CSCF selection server 280 determines that a CSCF server 270 is not associated with user device 210 (block 340—NO), process 300 may further include providing registration request to a local CSCF server 270 (block 380). Based on receiving the registration request, CSCF server 270 may register user device 210, and, as a result, user device 210 may be registered with a local CSCF server 270 instead of a non-local CSCF server 270. While process 300 is described in terms of assigning a local CSCF server in response to when user device 210 provides a registration request, in practice, process 300 may also apply when some other selection criteria or preferences are used in CSCF server assignment for a registration request.

Figure 4:
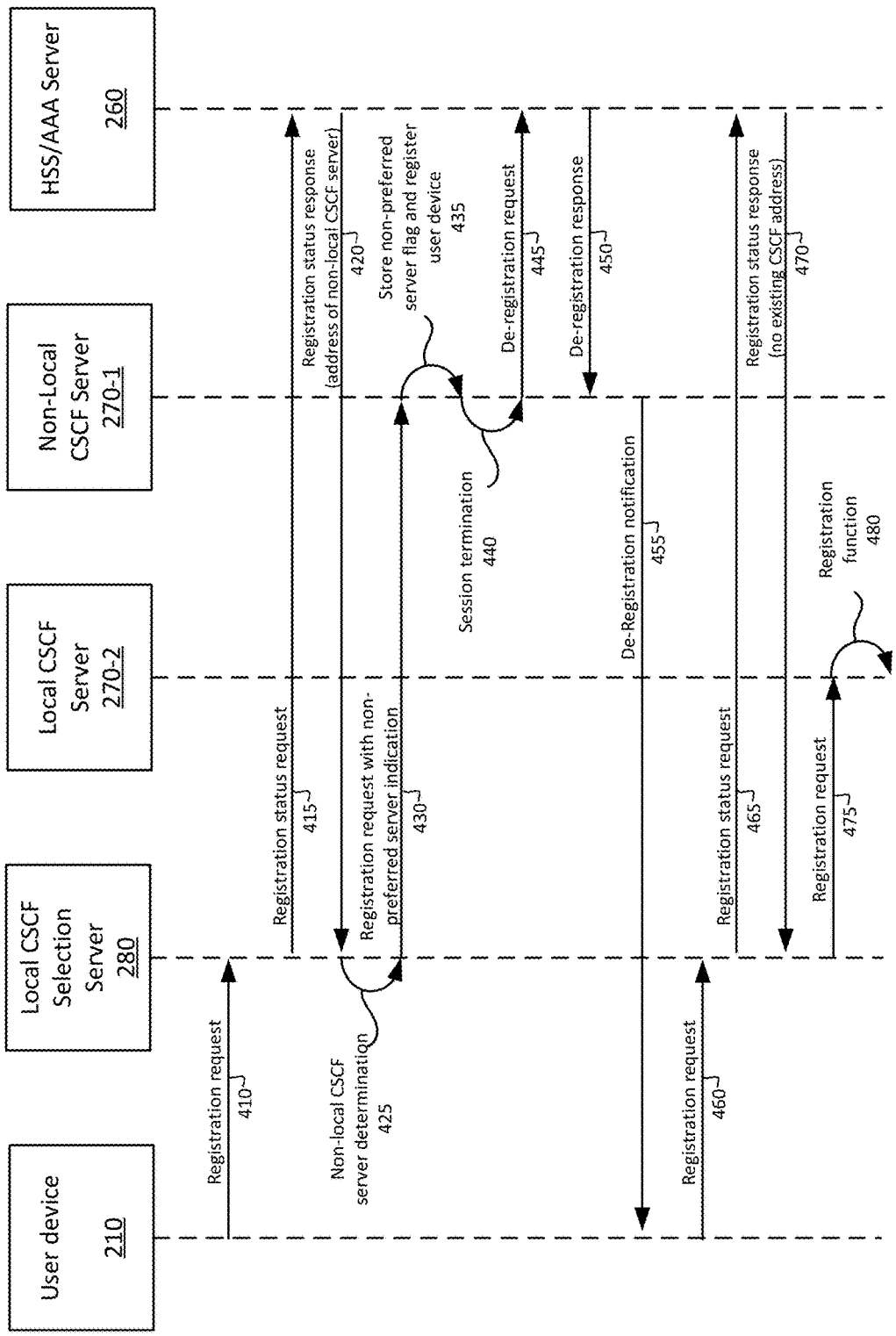
FIG. 4 illustrates a signal flow diagram of example operations for assigning a local CSCF server to a user device when an active session exists between a non-local CSCF server and the user device.

FIG. 4 illustrates a signal flow diagram of example operations for assigning a local CSCF server to a user device when an active session exists between a non-local CSCF server and the user device. An active session may exist between the non-local CSCF server (referred to as "non-local CSCF server 270-1" in FIG. 4) and user device 210 when user device 210 travels outside of the service area of non-local CSCF server 270-1 while communicating with non-local CSCF server 270-1. Alternatively, an active session may exist between non-local CSCF server 270-1 and user device 210 when non-local CSCF server 270-1 is assigned to user device 210 as a result of a network-initiated registration when user device 210 is powered off or otherwise not in communication with the IMS core.

As shown in FIG. 4, user device 210 may provide a registration request to a local CSCF selection server 280 (at 410). User device 210 may provide the registration request, for example, when a current registration expires, and/or when a radio of user device 210, used to connect to the EPS and/or IMS core, is powered on. The registration request may include an identifier of user device 210, and may include an identifier of a particular HSS/AAA server 260 associated with user device 210.

Based on receiving the registration request, local CSCF selection server 280 may provide a registration status request to HSS/AAA server 260 (at 415). The registration status request may include information identifying user device 210 and a request for an identifier of a particular CSCF server 270 associated with user device 210. HSS/AAA server 260 may provide a registration status response that identifies an address of non-local CSCF server 270-1 (at 420). Local CSCF selection server 280 may determine (at 425) that the address identifies a non-local CSCF server 270 (e.g., non-local CSCF server 270-1) and may provide a registration request with a non-preferred server indication to non-local CSCF server 270-1 (at 430).

Based on receiving the registration request with the non-preferred server indication, non-local CSCF server 270-1 may store the non-preferred server indication and may register user device 210 (at 435). Since an active session exists between non-local CSCF server 270-1 and user device 210, non-local CSCF server 270-1 may register user device 210 to prevent service interruption. Once the session between non-local CSCF server 270-1 and user device 210 has terminated (at 440), non-local CSCF server 270-1 may provide a de-registration request to HSS/AAA server 260 (at 445). HSS/AAA server 260 may then disassociate non-local CSCF server 270-1 from user device 210, and provide a de-registration response (at 450) to non-local CSCF server 270-1 indicating that the de-registration request has been processed. In some implementations, HSS/AAA server 260 may provide the de-registration response after authenticating non-local CSCF server 270-1. Non-local CSCF server 270-1 may provide a de-registration notification to user device 210 (at 455) based on receiving the de-registration response, and user device 210 may then provide a new registration request to local CSCF selection server 280 upon receiving the de-registration notification (at 460).

Based on receiving the registration request, local CSCF selection server 280 may provide a registration status request to HSS/AAA server 260 (at 465) similar to the registration status request previously provided (at 415). HSS/AAA server 260 may provide a registration status response (at 470). Since HSS/AAA server 260 dissociated non-local CSCF server 270-1 from user device 210 based on receiving the de-registration request (at 445), the registration status response (at 470), may indicate that no existing CSCF server address exists for user device 210. Based on receiving this registration status response, local CSCF selection server 280 may provide a registration request (at 475) to local CSCF server 270-2, and local CSCF server 270-2 may process the registration request to register user device 210 (at 480). As a result, user device 210 may be registered with local CSCF server 270-2 after the session with non-local CSCF server 270-1 has terminated. Further, user device 210 may be registered with non-local CSCF server 270-1 until the session has been terminated to prevent service interruption.

Figure 5:
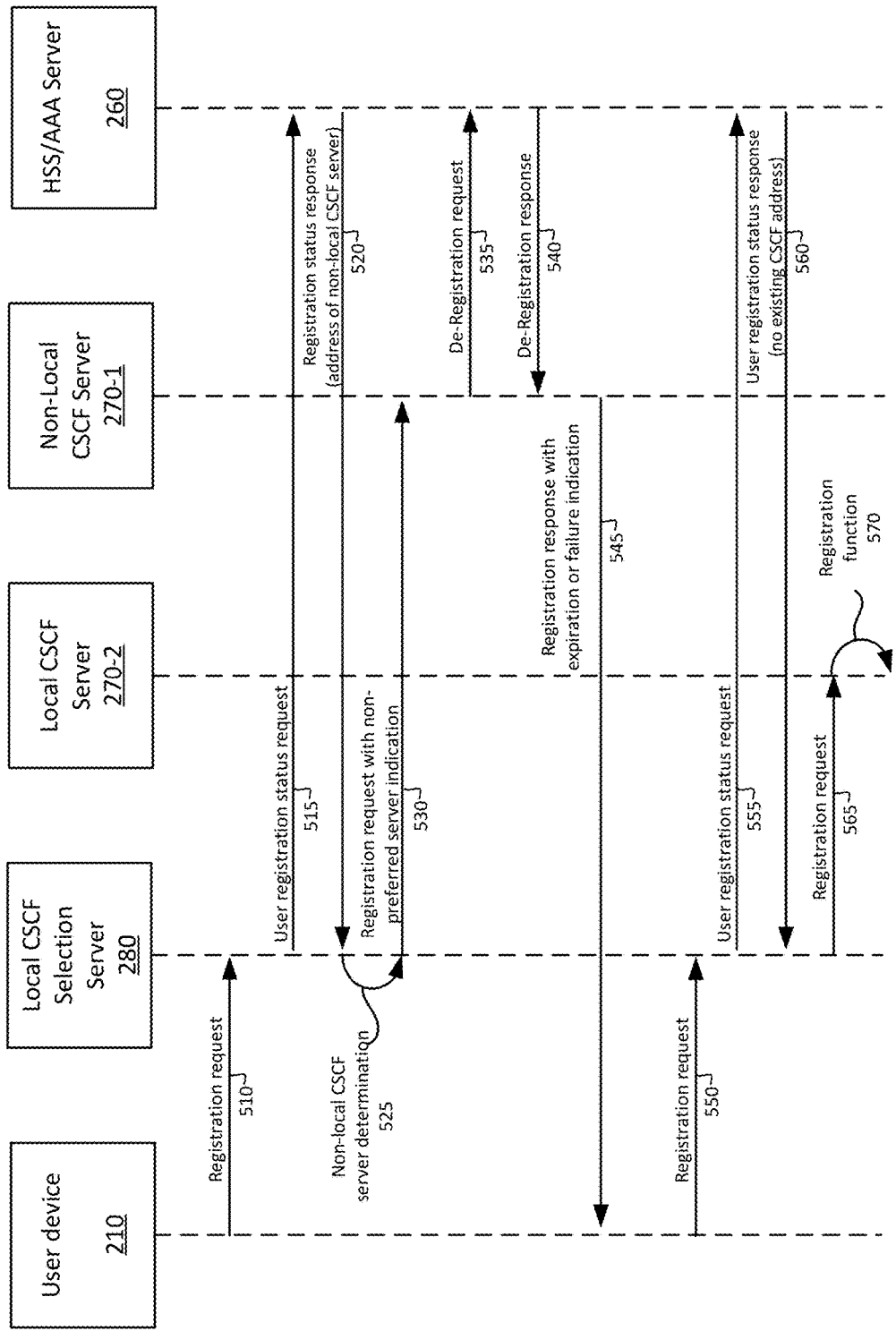
FIG. 5 illustrates a signal flow diagram of example operations for assigning a local CSCF server to a user device when an active session does not exist between a non-local CSCF server and the user device, but when the non-local CSCF server is previously registered to the user device.

FIG. 5 illustrates a signal flow diagram of example operations for assigning a local CSCF server to a user device when an active session does not exist between a non-local CSCF server and the user device, but when the non-local CSCF server is previously registered to the user device. The non-local CSCF server (referred to as "non-local CSCF server 270-1" in FIG. 5) may be registered to user device 210 when user device 210 had previously communicated with non-local CSCF server 270-1 and later traveled to a service area outside of non-local CSCF server 270-1.

As shown in FIG. 5, user device 210 may provide a registration request to a local CSCF selection server 280 (at 510). Based on receiving the registration request, local CSCF selection server 280 may provide a registration status request to HSS/AAA server 260 (at 515), and may receive a registration status response (at 520) that includes an address of non-local CSCF server 270-1. Local CSCF selection server 280 may determine (at 525) that the address identifies a non-local CSCF server 270 (e.g., non-local CSCF server 270-1) and may provide a registration request with a non-preferred server indication to non-local CSCF server 270-1 (at 530). Since an active session does not exist between non-local CSCF server 270-1 and user device 210, non-local CSCF server 270-1 may provide a de-registration request (at 535) to HSS/AAA server 260 in response to receiving the non-preferred server indication. HSS/AAA server 260 may then disassociate non-local CSCF server 270-1 from user device 210, and provide a de-registration response (at 540) to non-local CSCF server 270-1 indicating that the de-registration request has been processed. In some implementations, HSS/AAA server 260 may provide the de-registration response after authenticating non-local CSCF server 270.

Non-local CSCF server 270-1 may then provide, to user device 210 (at 545), a registration response (e.g., a response to the registration request received at 530). The registration response may include an indication that the registration between non-local CSCF server 270-1 has succeeded but expired. For example, the registration response may indicate the registration request has been completed successfully and an expiration indication identifying a registration period of 0 seconds to indicate that the registration has immediately expired. Alternatively, the registration response may indicate that the registration has failed. Based on receiving the registration response, user device 210 may immediately provide a new registration request to local CSCF selection server 280 (at 550) since the registration response indicates that the registration is expired or has failed.

Based on receiving the registration request, local CSCF selection server 280 may provide a registration status request to HSS/AAA server 260 (at 555) similar to the registration status request previously provided (at 515). HSS/AAA server 260 may provide a registration status response (at 560). Since HSS/AAA server 260 dissociated non-local CSCF server 270-1 from user device 210 based on receiving the de-registration request (at 535), the registration status response (at 560), may indicate that no existing CSCF server address exists for user device 210. Based on receiving this registration status response, local CSCF selection server 280 may provide a registration request (at 565) to local CSCF server 270-2, and local CSCF server 270-2 may process the registration request to register user device 210 (at 570). As a result, user device 210 may be registered with local CSCF server 270-2 when an active session does not exist between a non-local CSCF server and the user device, but when non-local CSCF server 270-1 was previously registered to user device 210.

Figure 6:
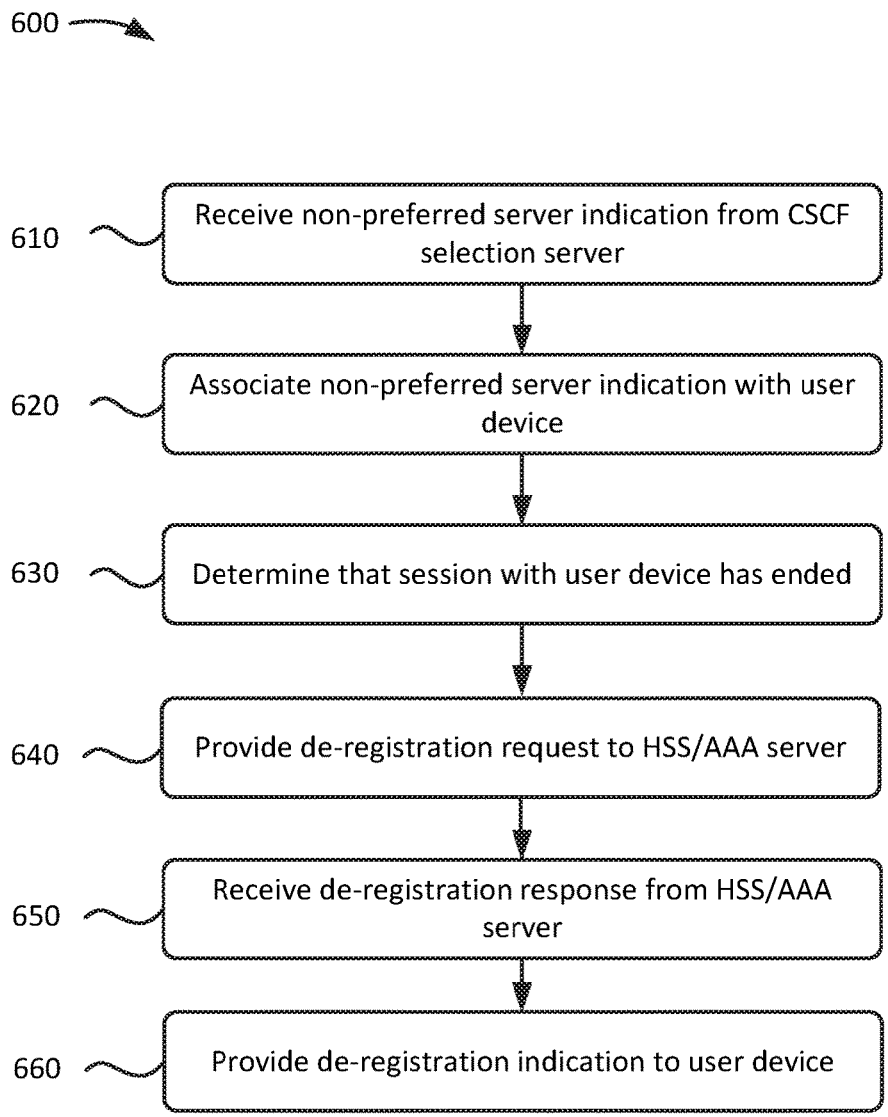
FIG. 6 illustrates a flowchart of an example process for de-registering a non-local CSCF server from a user device when an active session exists between the non-local CSCF server and the user device.

FIG. 6 illustrates a flowchart of an example process 600 for de-registering a non-local CSCF server from a user device when an active session exists between the non-local CSCF server and the user device. In some implementations, process 600 may be performed by CSCF server 270 (e.g. a non-local CSCF server 270). In some implementations, some or all of blocks of process 600 may be performed by one or more other devices.

As shown in FIG. 6 process 600 may include receiving a non-preferred server indication from a CSCF selection server (block 610). For example, non-local CSCF server 270 may receive the non-preferred server indication from CSCF selection server 280 when CSCF selection server 280 receives information identifying that non-local CSCF server 270 was previously registered to user device 210 (e.g., based on an address of non-local CSCF server 270 received from HSS/AAA server 260). In some implementations, non-local CSCF server 270 may register user device 210 since an active session exists between user device 210 and non-local CSCF server 270.

Process 600 may further include associating the non-preferred server indication with the user device (block 620). For example, non-local CSCF server 270 may associate the non-preferred server indication with user device 210 based on receiving the non-preferred server indication from CSCF selection server 280.

Process 600 may also include determining that the active session with the user device has ended (block 630) and providing a de-registration request to the HSS/AAA server (block 640). For example, non-local CSCF server 270 may determine that the active session with user device 210 has ended, and may provide the de-registration request to HSS/AAA server 260 after the active session has ended. As described above, the non-preferred server indication may direct non-local CSCF server 270 to provide the de-registration request once the active session between non-local CSCF server 270 and user device 210 has ended. Once HSS/AAA server 260 receives the de-registration request, HSS/AAA server 260 may disassociate user device 210 from non-local CSCF server 270 so that CSCF selection server 280 may select a local CSCF server 270 when user device 210 provides a new registration request to CSCF selection server 280.

Process 600 may further include receiving a de-registration response from the HSS/AAA server (block 650) and providing a de-registration indication to the user device (block 660). For example, non-local CSCF server 270 may receive the de-registration response from HSS/AAA server 260 (e.g., based on providing the de-registration request), and may provide the de-registration indication to user device 210 indicating that user device 210 should provide a new registration request. User device 210 may provide the new registration request to CSCF selection server 280, and CSCF selection server 280 may request registration status for user device 210 from HSS/AAA server 260. Since HSS/AAA server 260 de-registered user device 210 from non-local CSCF server 270, HSS/AAA server 260 may provide a null value and/or an indication that user device 210 is not associated with any CSCF server 270. CSCF selection server 280 may then select a local CSCF server 270 (e.g., an CSCF server 270 local to CSCF selection server 280), and provide the registration request to the local CSCF server 270. As a result, user device 210 may be registered with a local CSCF server 270.

Figure 7:
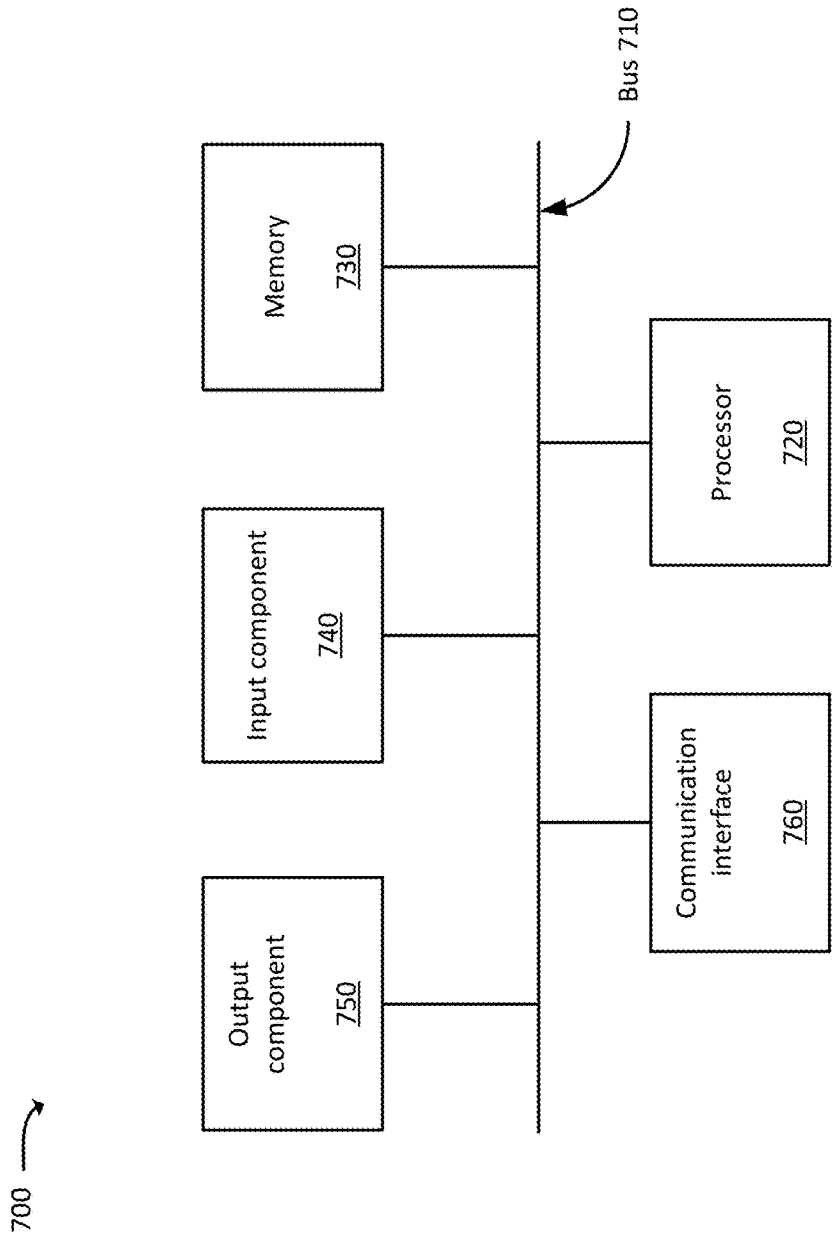
FIG. 7 illustrates example components of a device that may be used within the environment of FIG. 2.

FIG. 7 is a diagram of example components of device 700. One or more of the devices described above (e.g., with respect to FIGS. 1A, 1B, 2, 4, and 5) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3-6, the order of the blocks and/or signal flows may be modified in other implementations. Further, non-dependent blocks may be performed in parallel. Also, some or all of the signal flows may be transmitted via one or more devices not show. For example, some or all of the signal flows may be transmitted via a P-CSCF server or the like.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1A, 1B, and 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a selection server, a first registration request from a user device;
   determining, by the selection server and based on receiving the first registration request, that the user device is associated with a non-local call service control function (CSCF) server and that the user device is located outside of a service area associated with the non-local CSCF server;
   outputting, by the selection server and based on determining that the user device is associated with the non-local CSCF server and that the user device is located outside of the service area associated with the non-local CSCF server, a non-preferred server indication to the non-local CSCF server, the non-preferred server indication instructing the non-local CSCF server to disassociate with the user device;
   receiving, by the selection server and after outputting the non-preferred server indication to the non-local CSCF server, a second registration request from the user device, the second registration request having been sent from the user device based on the non-local CSCF disassociating with the user device in response to the non-preferred server indication;
   determining, by the selection server and based on the receiving the second registration request, that the user device is not associated with any CSCF server; and
   outputting, by the selection server, the second registration request to a local CSCF server, associated with a service area in which the user device is located, wherein outputting the second request to the local CSCF server facilitates a registration of the user device with the local CSCF server.

2. The method of claim 1, further comprising:
   providing a registration status request to a home subscriber server (HSS) associated with the user device, the registration status request including an identifier of the user device and a request for information identifying a CSCF server associated with the user device; and
   receiving, in response to the registration status request, a registration status response including an identifier of the non-local CSCF server,
      wherein determining that the user device is associated with the non-local CSCF server is based on receiving the registration status response.

3. The method of claim 2, wherein determining that the user device is associated with the non-local CSCF server is further based on a format of the identifier included in the registration status response.

4. The method of claim 2, further comprising:
   determining that the identifier in the registration status response is not included in a list of identifiers that identify local CSCF servers,
      wherein determining that the user device is associated with the non-local CSCF server is further based on determining that the identifier in the registration status response is not included in the list of identifiers.

5. The method of claim 1, further comprising:
   providing a registration status request to a home subscriber server (HSS) associated with the user device based on receiving the second registration request,
   the registration status request including an identifier of the user device and a request for information identifying a CSCF server associated with the user device; and
   receiving, in response to the registration status request, a registration status response indicating that the user device is not associated with any CSCF server,
   wherein determining that the user device is not associated with any CSCF server is based on receiving the registration status response.

6. The method of claim 1, wherein receiving the first registration request is based on the user device providing the first registration request after traveling from a first service area to a second service area,
the first service area being associated with the non-local CSCF server and the second service area being associated with the local CSCF server.

7. The method of claim 1, wherein outputting the non-preferred server indication to the non-local CSCF server causes the non-local CSCF server to output a de-registration request when an active session between the non-local CSCF server and the user device or a device associated with the user device has ended.

8. The method of claim 1, wherein outputting the non-preferred server indication to the non-local CSCF server device causes the non-local CSCF server to provide a de-registration request to a home subscriber server (HSS) to cause the HSS server to disassociate the non-local CSCF server from the user device.

9. A system comprising:
a non-transitory memory device storing a plurality of processor-executable instructions; and
a processor configured to execute the processor-executable instructions, wherein executing the processor-executable instructions causes the processor to:
receive a first registration request from a user device;
determine, based on receiving the first registration request, that the user device is associated with a non-local call service control function (CSCF) server and that the user device is located outside of a service area associated with the non-local CSCF server;
output, based on determining that the user device is associated with the non-local CSCF server and that the user device is located outside of the service area associated with the non-local CSCF server, a non-preferred server indication to the non-local CSCF server, the non-preferred server indication instructing the non-local CSCF server to be disassociated with the user device;
receive, after outputting the non-preferred server indication to the non-local CSCF server, a second registration request from the user device, the second registration request having been sent from the user device based on the non-local CSCF disassociating with the user device in response to the non-preferred server indication;
determine, based on receiving the second registration request, that the user device has disassociated from the non-local CSCF server; and
output the second registration request to a local CSCF server, associated with a service area in which the user device is located, to facilitate a registration of the user device with the local CSCF server.

10. The system of claim 9, wherein executing the processor-executable instructions further causes the processor to:
provide a registration status request to a home subscriber server (HSS) associated with the user device, the registration status request including an identifier of the user device and a request for information identifying a CSCF server associated with the user device; and
receive, in response to the registration status request, a registration status response including an identifier of the non-local CSCF server,
wherein executing the processor-executable instructions, to determine that the user device is associated with the non-local CSCF server, further causes the process to determine that the user device is associated with the non-local CSCF server based on receiving the registration status response.

11. The system of claim 10, wherein executing the processor-executable instructions, to determine that the user device is associated with the non-local CSCF server, further causes the processor to determine that the user device is associated with the non-local CSCF server further based on a format of the identifier included in the registration status response.

12. The system of claim 10, wherein executing the processor-executable instructions further causes the processor to:
determine that the identifier in the registration status response is not included in a list of identifiers that identify local CSCF servers,
wherein executing the processor-executable instructions, to determine that the user device is associated with the non-local CSCF server, further causes the process to determine that the user device is associated with the non-local CSCF server further based on determining that the identifier in the registration status response is not included in the list of identifiers.

13. The system of claim 9, wherein executing the processor-executable instructions further causes the processor to:
output a registration status request to a home subscriber server (HSS) associated with the user device based on receiving the second registration request, the registration status request including an identifier of the user device and a request for information identifying a CSCF server associated with the user device; and
receive, in response to the registration status request, a registration status response indicating that the user device is not associated with any CSCF server,
wherein determining that the user device is not associated with any CSCF server is based on receiving the registration status response.

14. The system of claim 9, wherein executing the processor-executable instructions, to receive the first registration request, causes the processor to receive the first registration request based on the user device providing the first registration request after traveling from a first service area to a second service area,
the first service area being associated with the non-local CSCF server and the second service area being associated with the local CSCF server.

15. The system of claim 9, wherein executing the processor-executable instructions, to output the non-preferred server indication to the non-local CSCF server, causes the non-local CSCF server to output a de-registration request when an active session between the non-local CSCF server and the user device or a device associated with the user device has ended.

16. The system of claim 9, wherein executing the processor-executable instructions, to output the non-preferred server indication to the non-local CSCF server device, causes the non-local CSCF server to provide a de-registration request to a home subscriber server (HSS) to cause the HSS to disassociate the non-local CSCF server from the user device.

17. A non-transitory computer-readable medium containing program instructions for causing one or more processors to:
receive a first registration request from a user device;
determine, based on receiving the first registration request, that the user device is associated with a non-local call service control function (CSCF) server and that the user device is located outside of a service area associated with the non-local CSCF server;

output, based on the determination that the user device is associated with the non-local CSCF server and that the user device is located outside of the service area associated with the non-local CSCF server, a non-preferred server indication to the non-local CSCF server, the non-preferred server indication instructing the non-local CSCF server to disassociate with the user device;

receive, after outputting the non-preferred server indication to the non-local CSCF server, a second registration request, from the user device, that is sent by the user device based on the non-local CSCF disassociating with the user device in response to the non-preferred server indication;

determine, based on the receiving the second registration request, that the user device is not associated with any CSCF server; and output the second registration request to a local CSCF server, associated with a service area in which the user device is located, wherein outputting the second registration request to the local CSCF server facilitates a registration of the user device with the local CSCF server.

18. The non-transitory computer-readable medium of claim 17, further including program instructions for causing the one or more processors to:

provide a registration status request to a home subscriber server (HSS) associated with the user device, the registration status request including an identifier of the user device and a request for information identifying a CSCF server associated with the user device; and receive, in response to the registration status request, a registration status response including an identifier of the non-local CSCF server,
   wherein determining that the user device is associated with the non-local CSCF server is based on receiving the registration status response.

19. The non-transitory computer-readable medium of claim 18, wherein the program instructions, to determine that the user device is associated with the non-local CSCF server, include program instructions to make the determination based on a format of the identifier included in the registration status response.

20. The non-transitory computer-readable medium of claim 17, further including program instructions for causing the one or more processors to:

determine that the identifier in the registration status response is not included in a list of identifiers that identify local CSCF servers,
   wherein determining that the user device is associated with the non-local CSCF server is further based on determining that the identifier in the registration status response is not included in the list of identifiers.

* * * * *